Jan. 29, 1952     J. I. YELLOTT     2,583,921
MULTIPLE ELEMENT VORTICAL WHIRL ASH SEPARATOR
Filed May 8, 1947     3 Sheets-Sheet 1
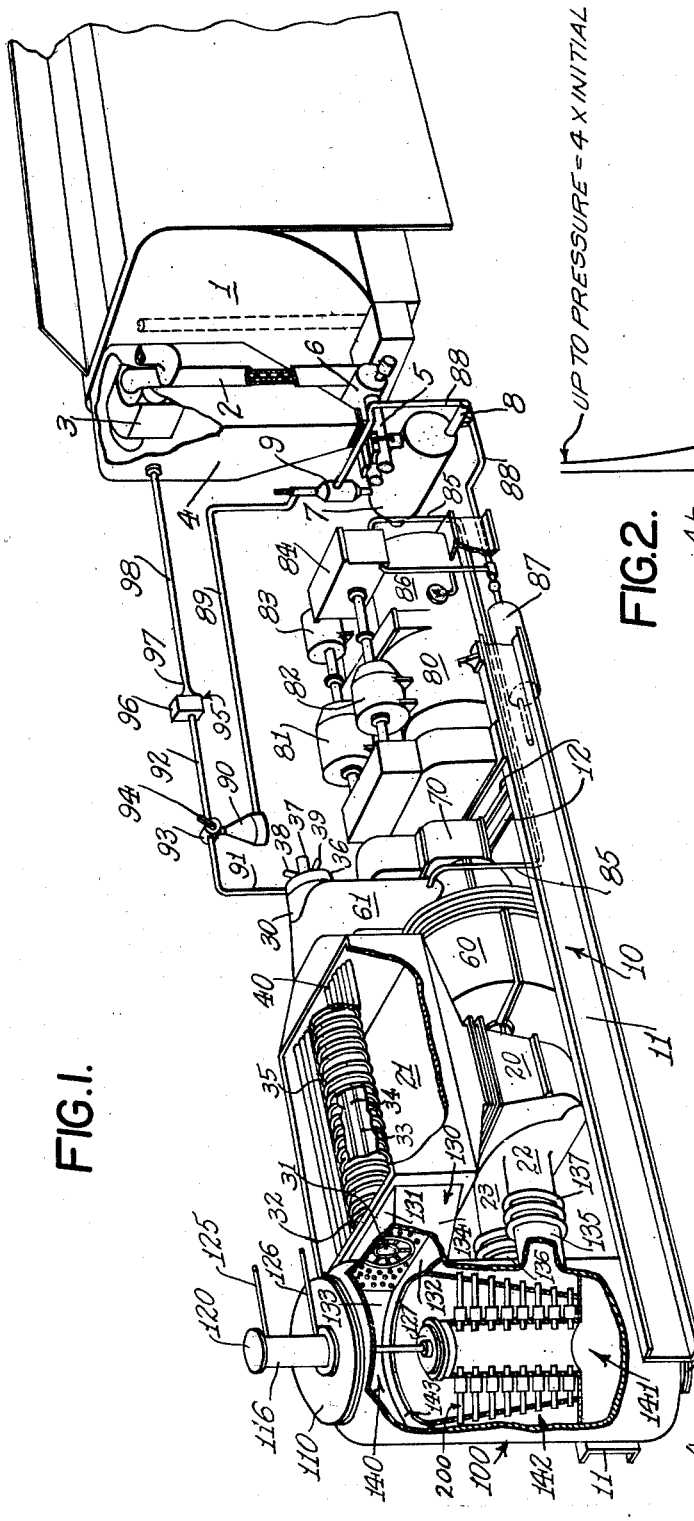
INVENTOR
JOHN I. YELLOTT
BY
Frederick Griswold, Jr.
ATTORNEY

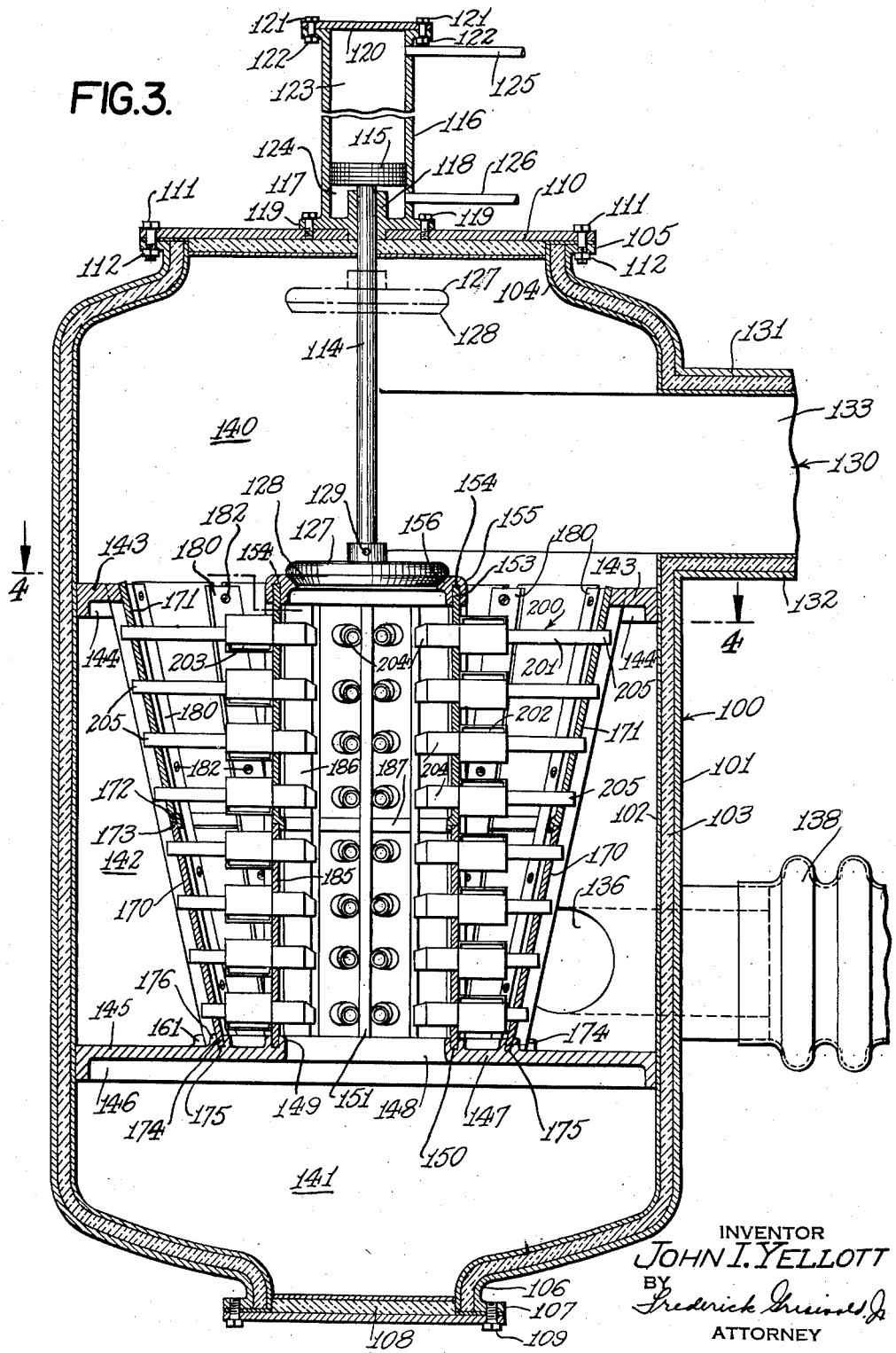

Jan. 29, 1952 J. I. YELLOTT 2,583,921
MULTIPLE ELEMENT VORTICAL WHIRL ASH SEPARATOR
Filed May 8, 1947 3 Sheets-Sheet 3
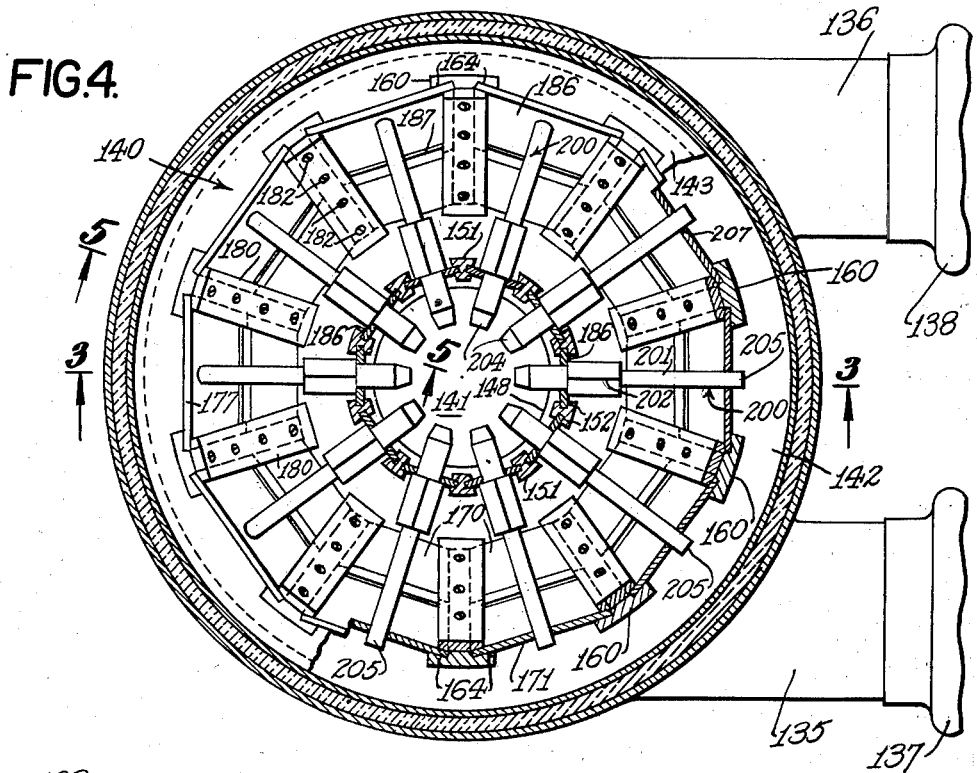
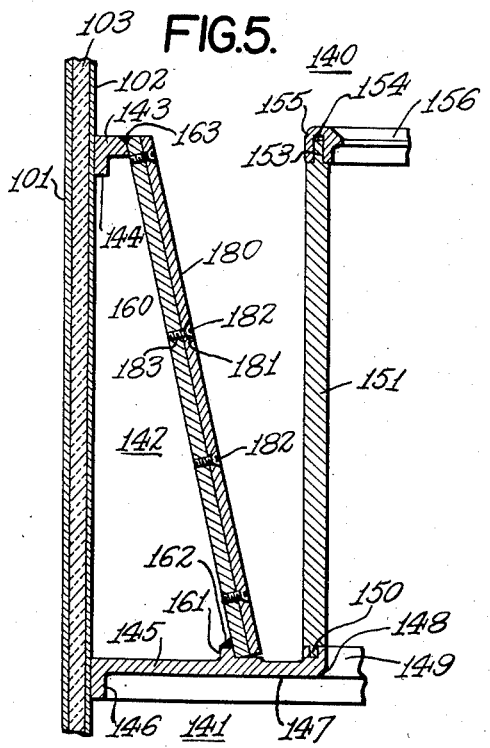
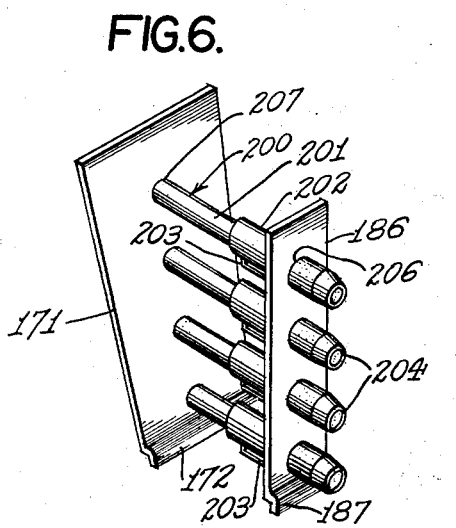
INVENTOR
JOHN I. YELLOTT
BY
Frederick Grunsel Jr.
ATTORNEY Patented Jan. 29, 1952

2,583,921

UNITED STATES PATENT OFFICE 2,583,921

MULTIPLE ELEMENT VORTICAL WHIRL ASH SEPARATOR

John I. Yellott, Cockeysville, Md., assignor to Bituminous Coal Research, Inc., Washington, D. C., a corporation of Delaware Application May 8, 1947, Serial No. 746,818

5 Claims. (Cl. 183—80)

1

This invention relates to improvements in the pressurized combustion of pulverulent solid fuels, and, more particularly, to a novel system and apparatus for separating fly ash from the gaseous products of combustion of pulverulent fuel.

In my application Serial No. 691,307, filed August 17, 1946, I have shown and claimed special equipment for separating fly ash from the products of combustion of a coal-fired pressurized combustive air heater burning atomized or pulverulent fuel under high pressures of the order of 50 to 100 p. s. i. In the said application, I disclosed certain forms of fly ash separators including batteries of miniature cyclone separators positioned in the motive fluid inlet to the gas turbine.

I have now found that improved equipment for separating fly ash from the products of pressurized combustion of pulverulent fuels, such as coal, can be secured by making the outer shell of the separator of cylindrical form, this being the best shape for a vessel which must stand internal pressures. I have found further that by arranging the multiple separator tubes of this unit in groups or clips around a central internal cylinder, an annular chamber can be provided through which the cleaned air can be led to the gas turbine. By arranging the groups of fly ash separators radially, like the spokes of a wheel, around this internal cylinder, the latter is communicated with or opens into a fly ash storage section located at the bottom of the separator proper. The inlet section of the separator is separated from the internal cylindrical zone to prevent mixing of dust-laden air with previously separated dust.

By the improved construction herein, the separator section can be by-pasesd and the raw products of combustion introduced directly into the turbine. Where gas or distillate oil fuel is used there will be no fly ash problem and the fly ash separating units normally are by-passed. Where the gaseous products of combustion of pressurized powdered fuel are used and the coarse particles of fly ash are separated from the heated air through the action of the separator tubes, the resulting fine particles have a tendency to coat the turbine blades. Abrasion of the blades has been found to be substantially prevented when the large particles are removed. If the fine coating builds up to too great a depth on the blade, it can be removed by blasting the blades for a short period of time with raw fly ash, that is, fly ash from which the coarse particles have not been separated.

2

With the improved apparatus herein, danger of explosion in a solid fuel powered gas turbine is avoided. Considering the gas turbine power plant utilizing in the neighborhood of 6,000 lbs. of air per million b. t. u. heat input to the plant, only 750 lbs. of air per million b. t. u. are theoretically required to burn the average fuel. Thus, in any portion of the power plant where the fuel is mixed with the total air supply, the mixture will be too lean to support combustion or create an explosion. However, within the actual flame tube, an approximately correct mixture of air and fuel will exist, and interlocking controls of the unit, will prevent coal from being admitted to the combustor unless air is flowing. For this reason, a serious concentration of coal is never built up in the flame tube. The most dangerous point in coal-fired gas turbine equipment is in the separated fly ash compartment of the fly ash separator. Any unburned coal dust will be separated out from the main air stream by the cyclone separators, and the unburned dust will, of course, be concentrated in the fly ash receiver to an extent where an explosion could take place as ignition occurred. It is not possible to prevent the building up of coal dust in the fly ash receiver when ignition is lost in the main combustor. Therefore, provision must be made to minimize and render harmless the effects of any explosion which might occur. By the special construction of the novel fly ash separator herein, the above and other desirable objects are readily attained.

The novel apparatus herein provides for a maximum of fly ash storage space together with a maximum of area through which to introduce the dust-laden air at the top, as well as to withdraw cleaned air at a point midway of the height of the separator. Through the construction herein, the interior is rendered readily accessible for inspection and repair, and the separator tubes can be removed at a minimum cost when necessary. By the use of longitudinally extended strips of separator tubes, in the same general fashion that cartridges are loaded into clips, the replacement and inspection of separator tube units can be most readily effected.

The features of novelty and advantage of the present invention which have been indicated hereinabove, will be more readily comprehended by reference to the following specification and accompanying drawings, wherein there is disclosed a power plant embodying a pulverized coal-fired gas turbine installation incorporating a novel fly ash separator, and in which like numerals refer to similar parts throughout the several views, of which Fig. 1 is a perspective view of a power plant embodying a gas turbine, a fly ash separator, coal bunker, and coal-fired combustor; the combustor, turbine-exhaust stack, and fly ash separator being shown partly in broken section;

Fig. 2 is a graph illustrating the effect of increase in vent area on explosion pressures in closed chambers;

Fig. 3 is an enlarged vertical section through the fly ash separator, taken on line 3—3 of Fig. 4;

Fig. 4 is a horizontal section taken on line 4—4 of Fig. 3;

Fig. 5 is a vertical section of a separator unit mounting, taken on line 5—5 of Fig. 4; and Fig. 6 is a perspective view of a replaceable clip or battery of cyclone separators mounted between wall panel elements.

Referring now to Fig. 1, the novel power system illustrated is more particularly described and claimed in my application Serial No. 746,817, filed May 8, 1947, which installation has been described with particular reference to its use in locomotives, as shown and claimed in my application Serial No. 691,307, filed August 17, 1946.

In the gas turbine-electric power unit and coal supply with pulverizing means, as shown in Fig. 1, the power plant comprises a bed or base 10 of spaced parallel everted channels 11, secured by interposed cross-bracing members, designated generally by the numeral 12. The power unit comprises a gas turbine 20, and a generator 80 coupled to the turbine shaft through gear box 70. Gas turbine 20 has an exhaust stack 21 in which is mounted a combustor 30 and two banks of regenerator tubes 40 on either side of the combustor unit. A pair of inlet ducts 22, 23 connect the turbine to a fly ash separator 100. Separator 100 is secured between the frame members 11 in any suitable manner. An air compressor 60 is mounted on the turbine shaft and discharges low pressure air on the order of 60 to 100 p.s.i. through ducts 61 into the combustor and regenerator tubes, as will be described more in detail hereinafter. Gear box 70 serves to couple the turbo-compressor shaft of generator unit 80, mounting auxiliary generators 81, 82 thereon. The auxiliary generator 81 serves to power auxiliary equipment, including a field generator or exciter 83 for the main generator 80. Auxiliary generator 82 is D. C. wound and the same shaft powers the high pressure compressor 84. This high pressure compressor, or auxiliary air pump, is conected through line 85 to the pressure or discharge side of compressor 60, as shown in Fig. 1. Compressor 60 discharges through line 86 and a T connection to an auxiliary high pressure air tank 87, and a separate high pressure air line 88. The pressure tank 87 will serve as a reservoir for airbrake air, and for other equipment, such as bell ringers, sanders, control equipment, and the like.

The coal utilized for combustion purposes in the apparatus herein is handled in the following manner:

The raw coal is stored in the closed hopper bunker 1 provided with stoker or other mechanical discharge means discharging into a screw elevator 2, which in turn feeds a crusher 3. The crusher 3 discharges comminuted coal of 8 mesh size, or smaller, into the hopper 4. The comminuted coal from hopper 4 discharges through coal pump 5, driven by motor 6, into pressure tank or container 7, from whence it is discharged by screw means through outlet 8 to the high pressure line 88. This line feeds into a cyclone separator or valve 9, which is connected through line 89 and coal atomizer 90, to feed line 91 of combustor 30. The valved separator 9 has a return to the pressure tank 16 which permits the removal of any desired quantity of coal from the air stream to the combustive air heater 39 to vary the air/coal ratio. A second by-pass for the air-borne coal from the feed line 89 back to the storage hopper 30, is provided by line 92, which is connected to the atomizer 90 through two-way valve 93. This arrangement permits the discontinuance of the coal feed and, conversely, the initiation of the coal feed, as when the turbine is first being started, after being initially supplied with gaseous or liquid fuel.

An aspirator 95 having a relatively large open chamber 96 is connected to the tip or discharge end 97 of dump line 92, the discharge end being preferably reduced, aligned with, and discharging into line 98 through the aspirator 95, the other end of the line 98 discharging into the crushed coal hopper 4. When, as in the case of crash stop, or when shutting down the engine at the end of a run, or for any other reason (as indicated above), the fluidized solid fuel supply in pressure line 89 is diverted through the atomizer into line 92 by operating valve lever 94, the extra heat originally contained therein is quenched by contact with an enormous excess of ambient air of low temperature inducted through the chamber 95, aspirated into and expanded through construction 97 into line 98. This operation effectually cools the heated pressurized, fluidized pulverulent fuel mass which has been previously heated by contact with the high pressure feed air. This discharged high pressure air, now effectively cooled to a temperature below the danger point of spontaneous combustion, with its pulverulent coal, which forms a very fine soot, is discharged into the hopper 4 and prevented from discharging directly into the atmosphere.

Because of this novel safety feature, fire or explosion hazards in the opeartion of the novel pressurized combustion system herein, are reduced below any danger point, even under conditions of shock and catastrophe such as obtain in train wrecks and the like.

The combustor comprises an inner flame tube 31, and an outer cylindrical sheath 32. Radially spaced, longitudinal fins 33, are mounted in and between the flame tube and the outer tube or sheath 32, and provide a plurality of longitudinal ducts 34 extending the length of the combustor and discharging directly into the plenum chamber of fly ash separator 100. The outer tube or sheath 32 is provided along its length with a plurality of spaced radial fins or extended surfaces 35. The combustor unit is mounted in the exhaust stack on generator casing 21 of the gas turbine 20 in such a manner that the extended surfaces or fins 35 are centrally disposed. Because of this disposition, the combustor unit is placed in direct, heat-exchanging relation with the products of combustion and the exhaust gases of the turbine.

The inner flame tube 31 is open at its discharge end, as shown in Fig. 1, and is closed at the opposite end by a cap or cover 36. The closure or cap member 36 will receive the fuel supply pipe 91, which introduces pulverized fuel into the flame tube in a pressurized, air-borne stream. The cap 36 is provided further with a fluid fuel inlet tube 37 for introducing liquid or gaseous fuel for starting the turbine, and a second fuel pipe 38 is provided for the introduction of a liquid or gaseous fuel to serve as a pilot light or igniter for the system. A sight tube 39 is also provided adjacent to the flame carrier, so as to permit inspection thereof. For remote inspection and control, the sight tube may be provided with a suitable alarm system. A photoelectric cell, or other flame-and-heat-responsive device may be connected thereto, suitable connections to the instrument board of the system being provided.

The fuel delivered through coal atomizer 90 and feed pipe 91 to the flame tube, will be combusted therein and the products of combustion will be diluted in the upper mixing chamber of fly ash separator 100 by the extra, relatively cool air delivered through longitudinal radial ducts surrounding the combustor casing and the air delivered through the tube sheets of the regenerator banks 40. The details of the novel fly ash separator will be described.

As shown in Fig. 1, 3 and 4, the fly ash separator comprises a generally cylindrical pressure vessel 100, having an outer steel wall 101, an inner stainless steel heat-resistant lining 102, and an intermediate or internal insulation filler 103 between the two wall sections. The upper end of the cylinder is necked in, as indicated at 104, to form a man hole. The neck 104 is provided with an everted flange 105 whose function will be described more in detail hereinafter. The cylinder is necked in at the bottom, as indicated at 106, to provide a restricted fly-ash discharge opening. This bottom neck portion is provided with an everted flange 107. The opening formed by the bottom neck 106 is appreciably less in diameter than the man hole 104, and is closed by a cover member 108 of the same material and wall thickness as the wall section of the cylinder. This cover is secured in place on the flanges 107 by any suitable means, such as machine screws 109. A top cover 110 is fitted into the top opening or man hole 104, and secured in place on the flanges 105 by means of bolts 111 and nuts 112. The top cover is of the same material as the bottom cover and the wall of the container. The cover 110 is centrally apertured, as indicated at 113, to receive shaft 114 of piston 115, which is mounted for reciprocation in cylinder 116 having a closed bottom 117 with a central boss 118 centrally apertured to receive the shaft 114 in sliding bearing engagement. The outer portion of boss 118 is received in a conformed aperture in the cover 110, and the cylinder is secured to the cover by machine screws 119 passing through the flanged base and into the top cover section. The upper end of the piston cylinder is closed by a removable plate 120, secured in place by bolts 121 and nuts 122. The piston 115 divides the piston cylinder into an upper chamber 123 and a lower chamber 124, which are severally connected to suitable sources of fluid supply by pipes 125, 126, respectively. A closure disc 127, having a beveled seat 128 is fixedly mounted on shaft 114 by pin 129. The disc 127 is adapted to be lifted up by the shaft 114 when piston 115 is urged upwardly by fluid pressure in the chamber 124. The function of the closure disc 127 will be described more in detail hereinafter in connection with the particular description of the separator tube assembly.

An inlet chamber 130 connects the upper portion of the cylinder 100 with the combustor discharge and the regenerator discharge outlets. The inlet duct or passageway 130 is provided with parallel top and bottom walls 131, 132 and outwardly flaring side walls 133, 134, formed as a unit with the pressure chamber 100 and secured to the exhaust stack of the turbine in pressure-tight relation. A pair of parallel outlet ducts 135, 136 are formed in the wall of the container immediately below the duct 130 and are disposed somewhat below the middle of the vessel. These ducts are severally connected to the inlets 22, 23 of the gas turbine by flexible coupling members 137, 138. Internally, the chamber or vessel 100 is divided into three sections: an upper plenum chamber 140, a bottom fly ash receiving chamber 141, and an intermediate cleaned gas-receiving chamber 142, which discharges into the outlets 135, 136. These chambers are formed in the following manner:

A flat annulus 143, having a depending annular flange 144 is secured to the inner wall 102 immediately below the throat or entry 130. A second annular plate 145, having a depending flange 146 is secured to the inner wall 102 in a plane immediately below the outlet ducts 135, 136. The member 145 has an inner rim section 147 defining a central aperture 148. The inner periphery of the central rim section is turned upwardly to form an annular bead 149, and this bead is grooved or apertured, to form a series of spaced sockets 150. Mounted in the sockets 150 are a plurality of parallel standards 151 of generally prismoidal shape, the sides being grooved, as indicated at 152 (Fig. 4), and the grooves of the severally adjacent members being in vertical alignment and register. The members 151 are tongued at the upper extremity, as indicated at 153 (Fig. 5), to receive slots 154 of ring 155, which is provided with a bearing surface or seat 156 into which the beveled bearing surface 128 of closure member 127 is adapted to seat.

A plurality of supporting ribs or members 160 are mounted at an angle between the upper annulus 143 and the lower annulus 145, in the following manner:

The upper surface of member 145 is provided with a plurality of studs 161, having obtuse bearing surfaces and being spaced inwardly from the beaded rim 149. The bottom of members 160 are secured to stud 161 in any suitable manner, as by means of fillet welds 162. The tops of members 160 are severally secured to the annular shoulder or platform 143 in any suitable manner, as by V welds 163. The members 160 incline at an acute angle to the wall of the casing. These members are bi-laterally milled, as indicated at 164 (Fig. 4), to form bearing surfaces for separator plates. The separator plates are made up of trapezoidal top and bottom sections 170, 171. The upper sections 171 (Fig. 6) have offset lips 172 adapted to seat and engage the upper edges 173 of the members 170. The bottom or narrow edges 174 of the lower segments 170 are received in slots 175 formed in bosses or ridges 176 disposed on the upper surface of member 145 and between the spaced bosses 161. The lateral angular edges of the member 170, 171 are adapted to be received in the conformed seats 164 formed in the supporting members 160. The inner periphery of the upper flange or shelf member 143 is provided with a plurality of flat edges 177, adapted to receive the upper edges of the segments 171 in air-tight, clamping relation. With the angular wall sections 170, 171 set in place against the supports 160, and the bottom sections being seated in their respective grooves, locking members 180 are applied on and over the members 160. Clamping strips 180 are provided with a plurality of apertures 181, which are countersunk to receive machine screws 182, which are received in aligned apertures 183 in the supporting ribs 160. With this construction, a demountable, substantially air-tight wall is formed to define, with the outer wall 102, an annular fly ash-free motive fluid plenum chamber 142 extending around the inside of the container 100.

A central, fly-ash flue or chamber is formed in this manner:

Rectangular sheet members 185 are fitted into lateral slots 152 of standards 151, the bottom edges being received in slots 150 of base plate 145. A second, upper series of plates 186 having offset bottom edges 187, are fitted in the slots 152 and over the bottom plates 185 to form continuous wall sections with and between the standards 151. When the clamping and sealing ring 155 is seated on and over the upper rim of the central cylinder formed by the standards 151 and the interposed plates, the latter are firmly held in substantially gas-tight, locked position.

With the construction immediately described, it will be seen that a central, substantially cylindrical chamber is formed in the pressure vessel as an upward extension of and opening into the bottom ash-receiving chamber 141, and separated from the clean gas chamber 142 by its own wall sections, the bottom flange or annular plate 145, and the inner inverted, frusto-pyramidal wall formed by plates 170, 171 and their locking and supporting members. The annular chamber or trough formed between the central cylinder and the inverted frusto-pyramidal inner wall of the chamber 142 forms a downward extension of the plenum chamber 140, and serves to receive and mount the radially arranged batteries of cyclone separators whose mounting and arrangement will now be described.

A plurality of cyclone separators 200 of the type illustrated generally in my application Serial No. 691,307, filed August 17, 1946, are fixedly mounted in place in the following manner: These separators, as shown in Figs. 3, 4 and 6, include body sections 201 with opposed scoops 202, 203 centrally thereof, an ash-discharging tubular end 204, and a cleaned gas discharging end 205. As noted hereinabove, the wall elements or plates 185, 186 are severally in vertical alignment with the angularly disposed wall plates 170, 171. These several plates are respectively provided with aligned apertures 206, 207, in which the aligned tubes 204 and 205 of the cyclone separators are received. The separators and the several plates may be permanently secured, as by welding, or in tight, friction-fit engagement. It will be seen that with the positive inter-engagement of the plate members and the separators, the radial units will be comprised of superposed clips which are essentially unitary in organization and can be handled and used as units. Thus, in setting up the novel fly-ash separator, the cover 110 will be removed. The bottom clip units formed between members 185 and 170 will be inserted in their respective slots, being introduced through man hole or top opening 104, and dropped into place. Thereafter the top segments or clips of the sets or units formed by plates 186 and 171 are inserted and dropped in place in a similar manner. Thereafter, the clamping plates or strips 180 are secured in place, and securely lock the clip combinations. The locking ring 155 is next set in place, on and over the segments of the central cylinder, completing the separator assembly. The cover 110 is replaced and the plug or disc 127 lowered into place to seat in the ring or seat 154. With the units ready for operation and when the turbine is first warmed up and set in operation by gas firing, or use of liquid fuel in the combustor, there will be no need for separation to remove fly ash, and the disc 127 can be raised as in the dotted line position of Fig. 2, providing a clear passage through the central cylinder and the separator units to the discharge chamber 142 and thence through the ducts 135, 136 to the gas turbine. As soon as the turbine is in operation, the disc 127 can be reseated in and on the ring 154, and the fuel supply changed to the coal unit by operating the coal crusher and pressure line to feed crushed coal to the coal atomizer 90 and thence through feed line 91 into the combustor. In the combustor, the pressurized coal, now at substantially 325 mesh, or below, for the greater part, is burned in the flame tube in the presence of sufficient air to insure complete combustion and under a pressure of the order of 60 p. s. i. By passing the diluting or cooling air through the banks of regenerator tubes and through the longitudinal ducts of the combustor shell, the total pressure of the combined gases is maintained substantially constant and there is only a small drop across the regenerator and combustor to the fly ash separator. In the separator, the special construction and arrangement of the disc 127 is such that it can stand, without difficulty, the normal small pressure differential which exists across it. It will be seen that the inner cylinder is at substantially the same pressure as that obtaining in the chamber 142 and the annular trough in which the separators are mounted. If an explosion occurs the disc 127 will not be unseated due to the excess venting area of the system, as described below, so that the effects of any explosion are minimized. In the instantaneous burning of coal dust, a maximum rise of 3,000° F. can occur. Since the normal operating temperature of the air in the inner cylinder will be about 1,300° F., or 1,760° abs., a rise in temperature of 3,000° F. would produce a total absolute temperature of 4,760°. This is a three to one increase in absolute temperature, and, in a closed vessel, would result in a pressure rise of three to one. Because of the extraordinary large venting area provided by the cyclone separators and the adjacent chambers the inner chamber 141 is instantaneously enlarged to include the upper chamber 140, the annular V trough immediately below it, as well as the throat 130 leading from the combustor unit to the fly ash separator, and the annular chamber 142, ducts 135, 136, and gas turbine 20. In other words, the quantity of intensely heated air developed in the cylinder and resulting from the explosion, can be allowed to flow into a volume approximating infinity and certainly at least three times greater than that of the chamber, so that the force of the explosion can be dissipated without resulting in harm to the equipment.

In a series of exhaustive studies on dust explosions the Bureau of Mines has found that a venting area of 5 sq. ft. per hundred cubic feet of explosion volume affords an ample safety factor in closed chambers where explosion hazards exist. As illustrated in the graph of Fig. 2, in a closed chamber of 100 cubic feet volume and having little or no vent area, a maximum pressure may develop amounting to four times the initial pressure obtaining in the chamber. Because of the lack of venting space, such conditions indicate positive explosion hazards. As the vent area increases up to 2½ sq. ft. per hundred cubic feet of explosion volume, it will be seen that the pressure developed in pounds per square foot decreases, arriving asymptotically at a maximum value between 5 and 10 sq. ft. of venting area per 100 cubic feet of explosion volume.

Considering these controlling factors with respect to the invention herein, the inherent safety factor will be apparent. The fly ash chamber 141 is in open communication with the upper plenum chamber 140 and the ducts 22, 23 leading to the turbine as well as with the chambers formed by the separator units 200 and their supporting structures. The separator units 200 provide free, substantially unimpeded paths between all chambers so that the fly ash chamber 141 has a vent area equal to substantially 70% of its surface which affords a positive assurance of safety from explosions due to delayed combustion of solid combustive materials in the fly ash chamber under high-pressure conditions.

In the highly pressurized combustion system herein this type of safety factor is of maximum importance from any and all standpoints, as well of operating efficiency as of the primary and controlling factor of safe-guarding human life. Because of the relatively enormous vent area provided, the pressures utilized can be greatly increased without increasing explosion dangers in a comparable manner. With any explosion in the fly ash chamber, the gases are vented immediately, in opposed directions, through the turbine on one side, and back through the plenum chamber and combustor on the other side, so that the volume of discharge space available in the turbine and its inlet ducts and outlet exhaust stack, as well as in the plenum and mixing chamber of the combustor, and the combustor itself together with the regenerator tubes, is almost infinite as compared with the restricted volume of the fly-ash receiving chamber. To repeat, the explosion hazard of the present system, which is essentially confined to the fly-ash chamber, is substantially eliminated by the novel mounting and arrangement of the several units of the fly-ash separator freely communicating with its inlet and outlet ducts.

The novel fly-ash separator shown herein provides for a maximum of fly-ash storage space, as well as a maximum of area through which to introduce dust-laden air at the top and to withdraw cleaned air at a point substantially midway along the height of the separator. With the use of the movable disc at the top of the separator, other and distinct advantages accrue. Power plants, and particularly gas turbines, are peculiarly dependent upon economical use of fuel. Thus, while oil is in some respects a more convenient fuel, yet the general availability and lower cost of coal can be fully utilized by the use of the instrumentalities herein, wherein the efficiency of the gas turbine cycle is increased to a maximum. However, if and when fuel costs dictate, the gas turbine can be operated regularly on a gaseous fuel, or on oil. As gas generally contains no ash and most oils contain no residue or ash, and this is particularly true of diesel fuels, the disc can be lifted, allowing the heated air or motive fluid to pass freely through the separator tubes. This will considerably reduce the pressure drop between the end of the combustive air heater and the inlet of the turbine. Thus, the efficiency of the power plant would be improved, when oil is used as a fuel, which is a particularly desirable situation, because of the normally higher cost of oil.

The invention herein has been described with particular reference to the mounting of the separator or cyclone elements in vertically aligned radial groups, or clips, which are easy to inspect and repair and can be readily replaced at minimum cost when necessary. However, it is to be understood that the separator herein may be made substantially integral throughout with the various elements interconnected in a unitary manner, as by welding. This would be a more costly procedure, and the configuration of the shell would have to be altered to permit the complete removal of the top section and possibly the bottom section, that is, the shell might be made up of segments or sections bolted or welded together. However, it is felt that the form particularly described and illustrated herein is adequate for all purposes.

What is claimed is:

1. An ash separator comprising a generally cylindrical chamber, having removable closures, transverse partition means dividing the chamber into an upper mixing chamber, a central separating chamber, and a bottom fly-ash-receiving chamber, an inlet duct feeding into the upper chamber, at least one outlet duct discharging from the second chamber, and means in the second chamber for separating fly-ash and discharging cleaned gases to the outlet duct and fly-ash to the bottom fly-ash-receiving chamber, said separating means comprising a battery of radially disposed horizontal cyclone separators and mounting means therefor comprising a bottom annular flange, a top annular flange, the outer peripheries of the said flanges being codiametral, and the inner surfaces of said annuli forming similar polygons, the polygonal faces of the upper said flange being greater than the corresponding faces of the lower said flanges.

2. Ash separator according to claim 1 in which the corresponding angles of the polygonal faces are joined by supporting strips.

3. Ash separator according to claim 2 in which the supporting strips are laterally rabbeted.

4. Ash separator according to claim 3 in which the bottom annular flange is provided with standards in radial alignment with the supporting strips.

5. Ash separator according to claim 4 in which the standards are laterally rabbeted.

JOHN I. YELLOTT.

REFERENCES CITED

The following references are of record in the file of this patent:

UNITED STATES PATENTS

| Number | Name | Date |
| --- | --- | --- |
| 730,782 | Morrison | June 9, 1903 |
| 1,180,792 | Norrman | Apr. 25, 1916 |
| 1,333,325 | McGee | Mar. 9, 1920 |
| 1,338,143 | McGee | Apr. 27, 1920 |
| 1,908,181 | Prouty | May 9, 1933 |
| 2,323,707 | Danz | July 6, 1943 |
| 2,422,214 | Meyer | June 17, 1947 |

FOREIGN PATENTS

| Number | Country | Date |
| --- | --- | --- |
| 539,069 | Great Britain | Aug. 27, 1941 |
| 541,845 | Great Britain | Dec. 15, 1941 |